July 25, 1961 — L. DE HELD — 2,993,252
ZIP FASTENER
Filed Dec. 29, 1958 — 7 Sheets-Sheet 1
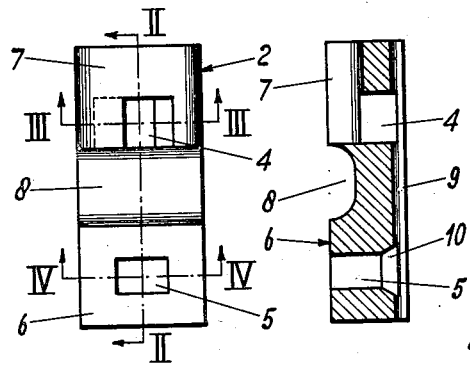
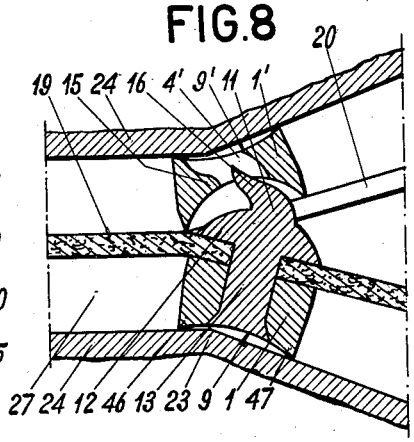
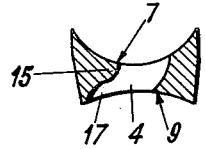
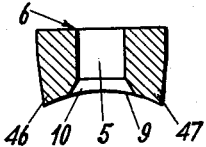
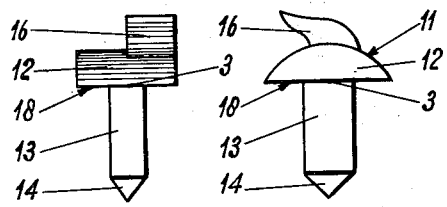
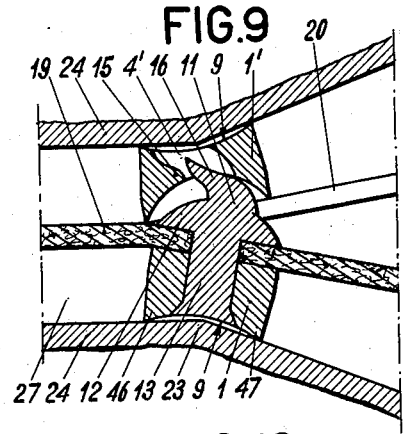
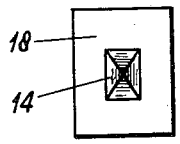
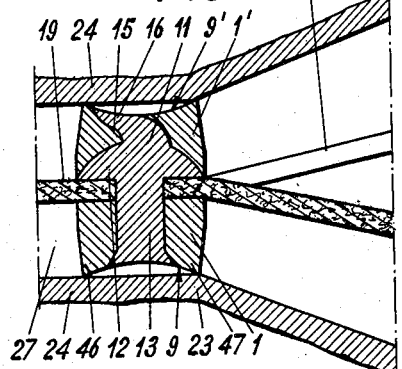
Inventor: Leendert de Held July 25, 1961 L. DE HELD 2,993,252
ZIP FASTENER
Filed Dec. 29, 1958 7 Sheets-Sheet 2

July 25, 1961   L. DE HELD   2,993,252
ZIP FASTENER

Filed Dec. 29, 1958   7 Sheets-Sheet 3

Inventor:
Leendert de Held
By Ivan P. Tashof
Attorney

July 25, 1961 L. DE HELD 2,993,252
ZIP FASTENER
Filed Dec. 29, 1958 7 Sheets-Sheet 4

Inventor:
Leendert de Held
By Iran P. Sachs
Attorney

July 25, 1961 L. DE HELD 2,993,252
ZIP FASTENER

Filed Dec. 29, 1958 7 Sheets-Sheet 6

July 25, 1961 L. DE HELD 2,993,252
ZIP FASTENER
Filed Dec. 29, 1958 7 Sheets-Sheet 7

INVENTOR
LEENDERT DE HELD
By Ivan P Lachof,
Attorney

2,993,252
ZIP FASTENER
Leendert de Held, Cort Van Der Lindenlaan 4,
Schiedam, Netherlands
Filed Dec. 29, 1958, Ser. No. 783,572
Claims priority, application Netherlands Jan. 3, 1958
16 Claims. (Cl. 24—205.1)

The invention relates to a zip fastener. There are known types of zip fasteners consisting of two rows of joining elements in which each row of elements is fitted to an edge strip of a pliant object, for instance a piece of cloth, rubber, flexible plastic or similar material and in which the joining elements can be made to engage with each other by a runner encompassing the two rows and permitting of being moved along the rows. These known types of zip fasteners are designed in such a manner that the interacting elements, when engaging with each other, turn towards each other about an axis which is perpendicular to the plane of the respective edge strip portions. In the known types of zip fasteners one element of one row interacts with two adjacent elements of the opposite row, or in other words, an element of one row becomes locked between two successive elements of the other row. This entails the drawback that an element may unintentionally become detached from the locked position, for instance as a result of wear, and/or if one of the strips or both of them are pulled lengthwise so that the material of the strip is stretched, the spacing between the elements is increased and it is no longer possible for one or more elements to interlock or to do so to a sufficient extent.

Furthermore, the construction of the known types of zip fasteners is usually such that the parts which are intended to engage with each other are situated beyond the extreme edge of the strip concerned, so that no closure is effected between the two strips or so that closure can only be achieved by the use of cumbersome expedients.

Moreover, in the known types of zip fasteners each element has only one joining device, or in other words, the holding of the element depends upon this one device, so that if this one device gets worn or damaged the closure does not grip at the selected spot.

The object of the invention is to eliminate these drawbacks and to produce a zip fastener each element of which interacts and engages with only one joining element of the other row, whilst furthermore each element has two joining devices which enable it to join up at two places with the joining element in the opposite row, so that on the one hand the construction can be made very strong and secure so that the zip fastener according to the invention is suitable for joining flexible objects of more or less heavy material such as tarpaulin, tent canvas, motor-car covers and such-like, whilst on the other hand a good, watertight closure of the two strip edges with respect to each other can be established in a simple manner because the interacting devices of the joining elements can be positioned on the same side of the extreme edges of the strips concerned, so that the strip edges can be pressed close against each other, whilst furthermore the two joining elements while engaging with each other can turn about an axis with respect to each other, which axis is parallel to the corresponding parts of the strip surfaces and is substantially perpendicular to the direction of the rows of elements at that spot, that is, perpendicular to the direction of the rows of joining elements at that spot.

According to the invention this object is achieved by the fact that a joining element of the row on one strip only engages in and interacts with a single joining element of the row on the other strip and each joining element has a joining stud and a correspondingly shaped stud-hole, the said joining stud consisting of a guide piece having the shape of a cylindrical segment on which there is a projecting cam pointing backwards, which projecting cam preferably has a tail-like or nose-like form and is able to engage behind a projecting lug or lug edge pointing forwards, which projecting lug or lug end is positioned in the stud-hole of the element in the other row that interacts with it; in which device, while the two interacting elements are being caused to interact, they can turn with respect to each other about an axis which is situated parallel to the corresponding strip edge portions and perpendicular to the direction of the rows of joining elements at that spot.

By "pointing forwards" is meant pointing in the direction in which the runner has to be moved in order to effect closure of the zip fastener, whilst "pointing backwards" means pointing in the opposite direction. The projecting cams thus point in the direction of the already closed portion of the zip fastener, whilst the projecting lugs point to the portion that has not yet been closed.

The stud-hole in each element is in two parts, consisting firstly of a cup having the shape of a cylindrical segment, which part is foremost, and secondly of a channel which passes obliquely into the first-mentioned part so as to form a projecting lug. During interaction of the two joining elements the projecting cam of one element becomes hooked behind the projecting lug of the opposite element.

The different joining elements are fixed to the edge strip in the following manner. In addition to the aforementioned stud-hole each element body also has a second hole, viz., the attaching pin hole, which may for instance be of rectangular cross-section. The joining studs, which are loose in themselves, are provided on their underside with an attaching pin which fits into an attaching pin hole. The attaching pin is first passed through the material of the edge strip and then through the attaching pin hole, so that the edge strip can be securely clamped between the underside of the stud and the corresponding upper face of the element body which is positioned around the attaching pin hole, after which the end of the attaching pin can be clinched or swaged. If desired, the edge strip may previously be provided with a hole to enable the attaching pin to be passed through more easily. In this way the joining elements are arranged in a row along the edge strips at a fixed distance apart, after which a suitable runner is placed around the two rows in such a manner that this runner encompasses two rows and can be moved with them, during which movement two elements at a time engage successively with each other. It is advantageous to give each element body a substantially rectangular form. The attaching pin hole and the joining stud may then be situated adjacently in the lengthwise direction of the element, this lengthwise direction being at right-angles to the direction of the strip edge; moreover, between the stud and stud-hole a groove is provided which passes across the entire breadth of the front face of the joining element, which groove has the task of receiving the strip edges and, if desired, of pressing them against each other when the zip fastener is in the closed position. Each joining element is fixed to the strip in such a manner that it is positioned with its lengthwise direction perpendicular to the direction of the strip edge, so that the stud and stud-hole of a joining element are situated on either side of the strip edge.

The joining stud is positioned within the strip edge, whilst the stud-hole is outside this edge. Owing to the fact that the stud is fitted with an attaching pin, the lug edge being situated at the bottom of the cup, the result is obtained that when the zip fastener is in the closed position the joining stud of an element in the row on one strip and the engaging stud-hole of the element in the row on the other strip are situated on the same side of the respective edge strip and also within the border of that strip. In regard to the other stud and stud-hole system of the two interacting elements which are in engagement with each other the same applies with respect to the other strip, the two strip edges being situated between the two engaging stud and stud-hole systems, that is, in the space formed by the two transverse grooves situated between the stud and stud-hole of each element. These transverse slots thus have the direction of the respective row of elements, that is, the direction of the strip edge. On closure of the zip fastener according to the invention two elements that are engaging with each other will move the two respective strip edge portions towards each other in a direction substantially perpendicular to these two strip edge portions, which action will naturally be accompanied by the aforementioned turning movement. From this it follows that the plane of the channels under a V in the runner is perpendicular to the plane of the respective strip portions, unlike the usual known types of zip fasteners in which the plane of the V of the channels is precisely parallel to the plane of the two respective strip portions.

From the foregoing it follows that the describing lines of the cylindrical guide piece of the joining stud, and also the describing lines of the respective cup of the stud-hole, are situated in the direction of the plane of the corresponding edge strip and are perpendicular to the direction of the joining elements at that spot. The projecting part on the cylindrical guide piece of the joining stud is preferably shaped like a tail or nose, whilst the oblique channel of the stud-hole has a shape corresponding to that of this projecting part and issues forth into the bottom of the cup so as to form the projecting lug, which points in a forward direction.

Between the joining stud and the stud-hole of a joining element is the transverse groove which, running in the direction of the strip edge, passes across the entire breadth of the front face of the joining element.

The rear side of each joining element is preferably provided with a recess running in the direction of the cylindrical surface of the cup and guide piece; in other words, if this recess is also a part of a cylinder casing, the describing lines of the recess run parallel to the describing lines of the cup of the guide piece. This recess enables the rear side of the joining element to be moved along an angle that occurs in the channel of the runner. In this way the rear side of each element has two edges which are situated in the direction parallel to the respective portion of strip surface and perpendicular to the direction of the row of joining elements at that spot. Along with these edges the rear side of the joining element travels over the respective channel wall of the runner and can thus move around the aforementioned angle in the channel of the runner.

The runner has two channels in V-formation which issue forth into a common channel so as to form a Y. These channels are of a form that is adapted to the special shape of the joining elements. As the flexible material to which the joining elements are attached must also be able to slide along with them through the runner, each channel has a groove which connects it with the outer surface of the runner. The two grooves are in opposite positions, that is, they issue forth on to mutually opposite surfaces of the runner and need not be wider than is demanded by the thickness of the flexible strip. As the elements are finally made to engage with each other, the common channel on either side will have a similar groove, so that the joined strips can slide as a single entity through the runner. The two grooves through which the flexible strips can slide, thus join the respective channel to the outer side of the runner in a direction perpendicular to the plane formed by the V of the channels, and these grooves pass in the direction of the channels themselves across the entire length of the runner.

In order that the runner may be set at a particular position along the row of joining elements, it also has a locking device which is automatically unlocked when the runner is pulled but which is re-locked when the runner ceases to be pulled along. This locking device interacts with the pulling device, that is, with a pull brace and an attached pull wing of the runner.

For the purpose of locking the runner is provided with a locking pin hole which is perpendicular to the Y-plane of the runner channels and which emerges at one side on to the exterior of the runner and on the other side into the channels positioned in V-formation. The locking pin of the locking device is now inserted in this locking pin hole. The locking device consists of a hollow hood open at one end, a manipulator to which the locking pin is fitted, a plate spring, a pull wing with pull brace, and fixing devices for fixing the hollow hood to the exterior of the runner. The hollow hood has two fixing lips by means of which it is placed on the runner, the open end of the hood being brought into position over the locking pin hole of the runner. Fixing can be effected by screwing or riveting in the known manner. The flat, hollow hood is only open at one end; the other end, which may for instance be semicircular, is closed. The hood has furthermore two side walls positioned opposite each other; in each of these side walls there is a brace-hole whose wall at the end where the aperture of the hood is situated possesses the shape of an obtuse V.

The point of the V thus points towards the aperture of the hood and when the locking device is in position this point therefore also points towards the locking pin hole of the runner. The manipulator can be inserted in the cavity of the hood and is shaped accordingly, so that the locking pin then projects beyond the hood. This manipulator is likewise provided with a brace-hole which, when the locking device is in position, partly corresponds with the brace-holes of the hood, but at the manipulator the wall of the aperture is in the shape of an obtuse V the point of which is pointing in the direction opposite to that in which the locking pin is pointing. When the locking device is in position the V of the manipulator thus points away from the locking pin hole.

The plate spring is inserted in the cavity of the hood, between the manipulator and the inner wall of the hood, so that the spring tends to prevent the manipulator from moving further inward, and when the locking pin is tensioned the spring tends to push the locking pin further away from the hood. The two brace-holes in the hood and the brace-hole in the manipulator partly overlap when the locking device is in position, and the manipulator is passed through these three holes. When the brace is pulled in a direction at right-angles to the locking pin, the brace runs up against the slope of the brace-holes in the hood and thereby presses against the sloping wall of the brace-hole of the manipulator, as a result of which the manipulator with its attached locking pin moves along further in the hood against the pressure of the spring as it becomes tensioned, and the locking pin therefore moves outward a certain distance from the locking pin hole. The size of the holes may, in view of the thickness of the brace, be made such that when the spring is untensioned there is a certain clearance, so that the brace can move freely in the holes. When the locking pin is withdrawn from the locking pin hole its end will release the joining elements, so that the runner can be moved freely along the row of elements. When the brace is relaxed the spring again presses the locking pin further away from the hood and deeper down into the locking pin hole, so that its extremity is interposed between two elements of one row or between the studs of two successive joining elements, thus preventing further movement of the runner. The pull brace has a pull wing pivoted on to it in such a manner that the runner can be pulled in either direction at will.

If the strips to be joined together are of rubber or a flexible plastic, it is advantageous to make the edges of these strips somewhat thicker than the strips themselves, so that by pressing these thickened edges on to each other a good watertight closure is produced. For this purpose the depth of the transverse grooves between the joining device of each element is made such as to ensure good pressing together of the strip edges.

By way of example the invention is elucidated below on the basis of the outline drawings.

FIG. 1 gives a top view of an element body, which is thus seen in the plane in which the joining stud is positioned;

FIG. 2 shows a section of the element body according to FIG. 1 through the line II—II;

FIG. 3 shows a section of the element body of FIG. 1 through the line III—III, that is, through the stud-hole in which a joining stud can engage;

FIG. 4 shows a section of the element unit of FIG. 1 through the line IV—IV, that is, through the attaching pin hole, with the aid of which a joining stud fitted with an attaching pin can be placed on the element;

Figure 11:
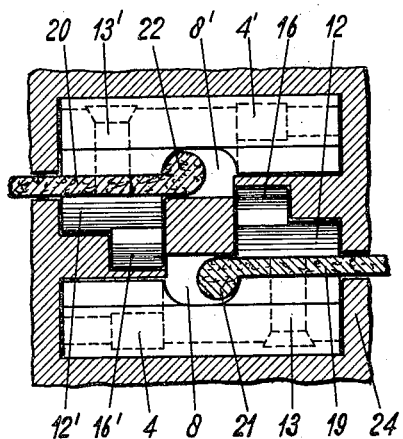
Figure 12:
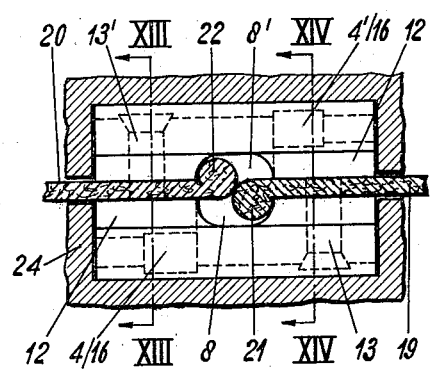
Figure 13:
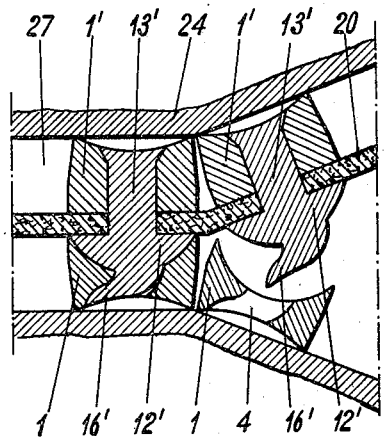
Figure 14:
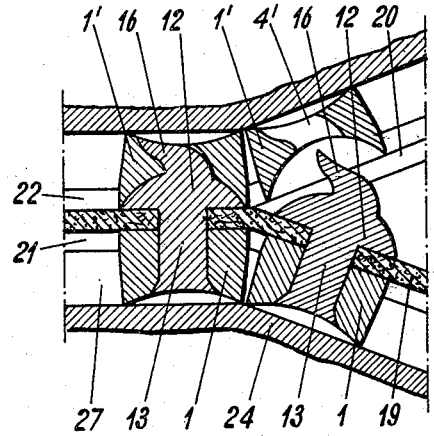
Figure 15:
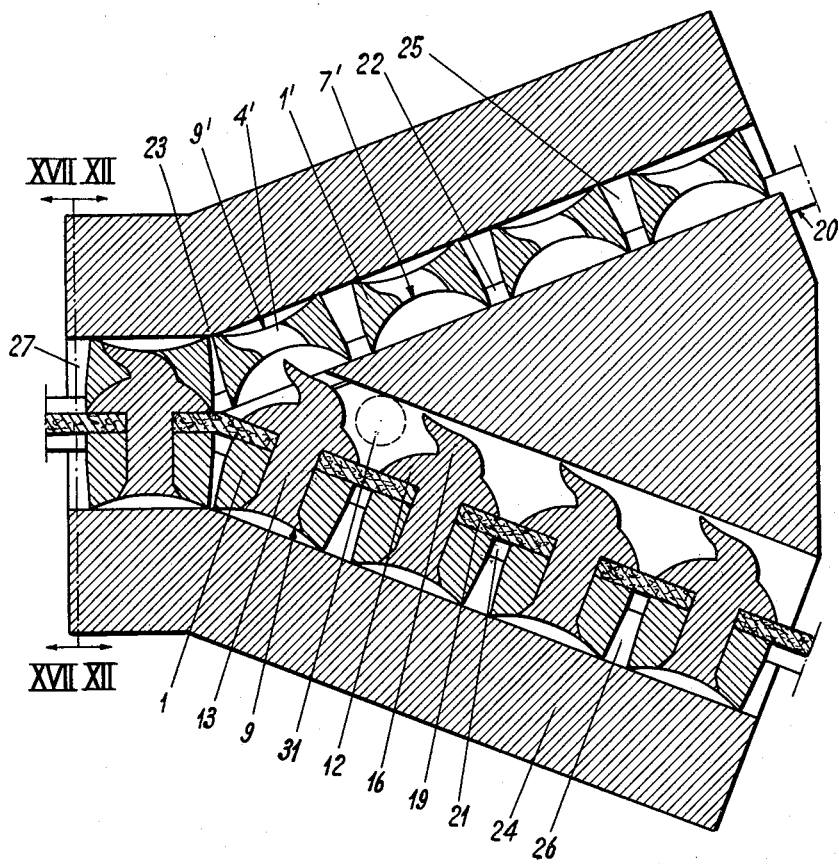
Figure 16:
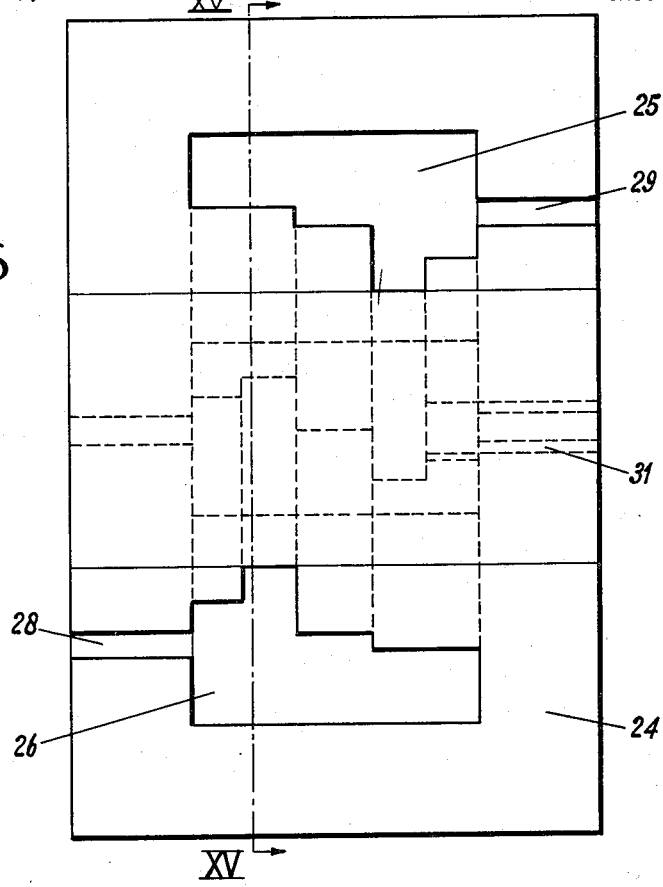
Figure 17:
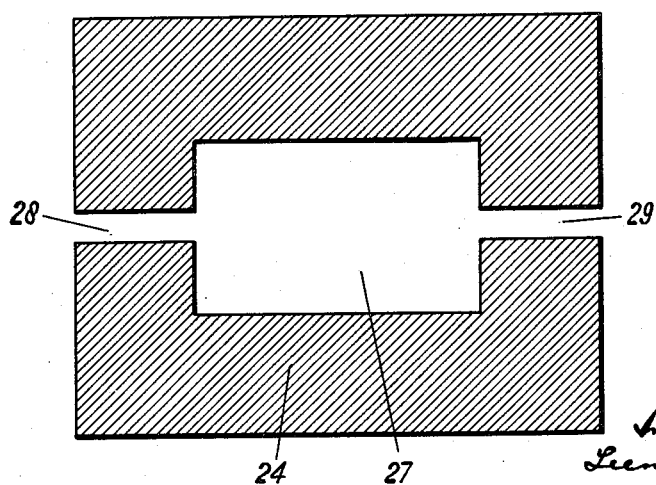
Figure 18:
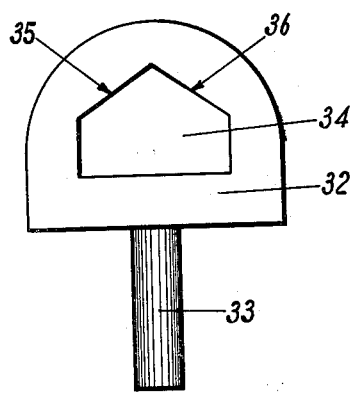
Figure 20:
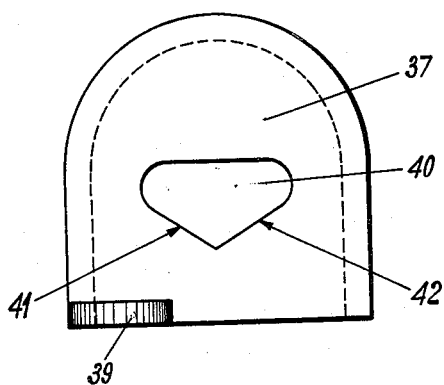
Figure 19:
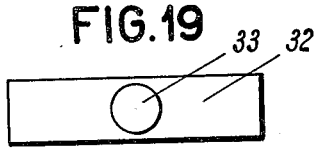
Figure 21:
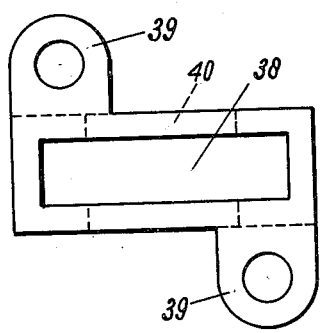
Figure 23:
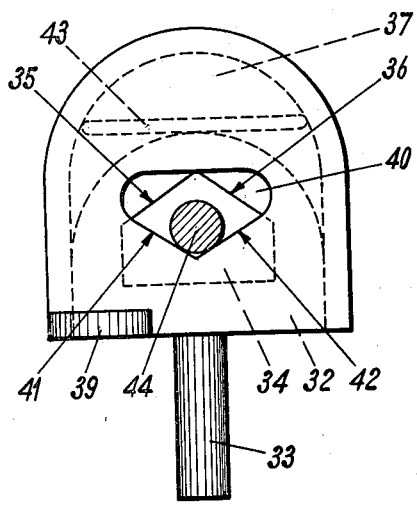
Figure 22:
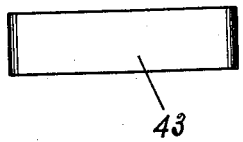
Figure 24:
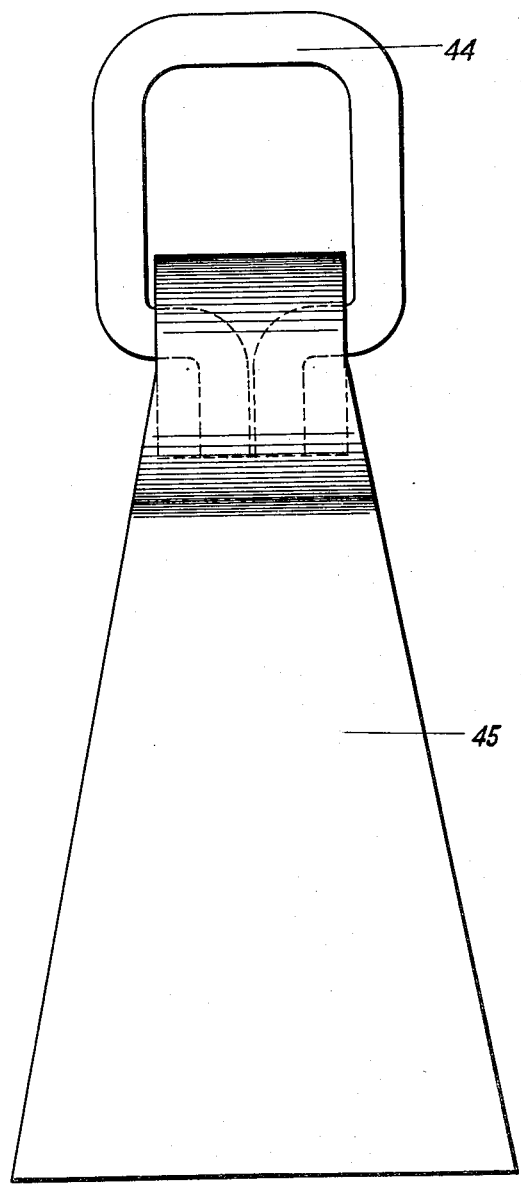
Figure 25:
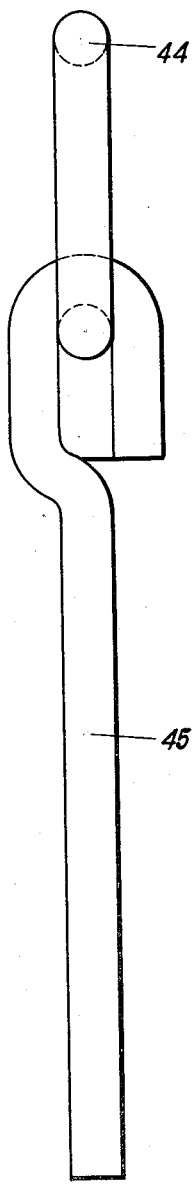
Figure 7A:
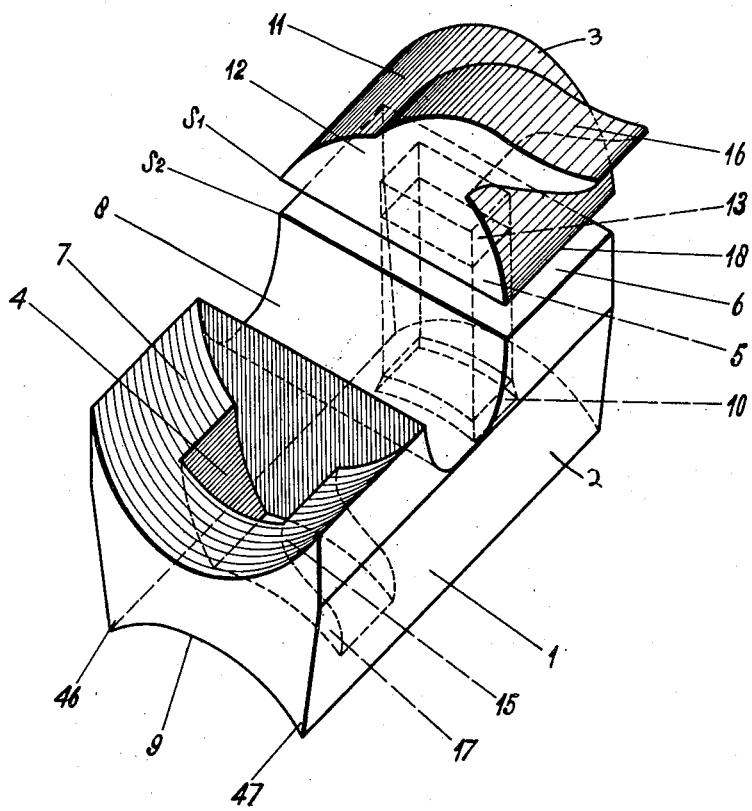

FIG. 5 gives a view of a stud body that can be fitted to an element body according to FIG. 1;

FIG. 6 gives a bottom view of the stud body of FIG. 5, looking towards the point of the attaching pin;

FIG. 7 gives a side view of the stud body of FIG. 5, seen this time in a direction perpendicular to that of FIG. 5;

FIG. 7a is a perspective view of an assembled joining or interlocking element showing the stud positioned in the body of the element, the fabric to which the element is secured being omitted for the purpose of clarity;

FIGS. 8, 9 and 10 show how the joining stud is placed on an element body and how it engages in the stud-hole of an opposite element body, in three different positions;

FIG. 11 shows two joining elements directly opposite each other in a position in which the respective studs do not engage in the holes provided, so that the edges of the strips are not in contact with each other;

FIG. 12 shows the same as FIG. 11, but this time the studs do engage in the stud-holes as is the case when the zip fastener is in the closed condition, the strip edges being in contact with each other;

FIG. 13 gives a section of two successive joining elements situated within the runner through the line XIII—XIII of FIG. 12;

FIG. 14 shows the same as FIG. 13, but in section through the line XIV—XIV;

FIG. 15 gives a section of the runner with the zip fastener inserted, in which figure the position of the locking pin hole is indicated;

FIG. 16 gives a top view of the runner of FIG. 15, in the plane in which the channels emerge separately;

FIG. 17 gives a section of the runner through the line XVII—XVII of FIG. 15;

FIG. 18 gives a side view of the manipulator of the locking device belonging to the runner;

FIG. 19 gives a bottom view of the manipulator of FIG. 18, looking towards the end of the locking pin;

FIG. 20 gives a side view of the hollow hood belonging to the locking device;

FIG. 21 gives a bottom view of the hollow hood of FIG. 20, looking towards the aperture of this cover;

FIG. 22 gives a view of the rectangular plate spring;

FIG. 23 gives a combined view of the hollow hood, the manipulator and the plate spring, in which figure a section of the inserted pull brace is shown;

FIG. 24 shows a pull wing with pull brace;

FIG. 25 shows the same as FIG. 24, but now viewed over its narrow side.

FIG. 7a shows an assembled joining or interlocking element according to the present invention. Before describing this figure it will be appreciated that zippers or slide fasteners are constituted by a pair of stringers, each stringer having thereon a series of interlocking elements, the elements being so mounted on the stringers that when the slide or runner is moved in one direction the elements of one stringer interlock with the elements of the other stringer and when the slide or runner is moved in the other direction the elements are separated from each other to open the closure. According to the present invention the interlocking or joining elements of each series are identical, with each element of one series interlocking with an oppositely positioned element of the other series, such interlocking being accomplished independently of adjacent elements.

In FIG. 7a 1 represents the assembled interlocking or joining element. This element has a body portion 2 having a pin receiving hole 5 therein. Secured to the body 2 is a stud body 3, the stud body having three parts or sections, namely, an attaching pin 13 at one end, a projecting cam or lip 16 at the other end and an intermediate guide piece or base 12. The pin 13 and the corresponding pin hole 5 are preferably rectangular, the stud body 3 being secured to body 2 by inserting pin 13 into pin hole 5 and the extremity of the pin 13 is enlarged to conform with the enlargement 10 on the bottom of the pin hole 5 thereby fixedly securing the stud body 3 in the element body 2. The base 11 is convex and preferably of cylindrical shape, the axis of the cylinder being parallel to the longitudinal axis of the element body 2.

In order to secure the joining element to the stringer, which is made of fabric or similar flexible material, the fabric is positioned against face 6 of the element body adjacent the pin hole 5 and the pin 13 of the stud body is passed through the stringer and into pin hole 5 to clamp the stringer between face 6 of the element body and lower face 18 of the base 12 of the stud body and then the bottom extremity of the pin is enlarged to fix the stud body 3 to the element body. In FIG. 7a, for purposes of clarity, the stringer has been omitted, said stringer normally occupying the space between planes S1 and S2.

Near the other end of the element body 2 there is formed a stud hole 4 which is complementary in shape to the base 12 and lip 16 of the stud body 3. Between the stud hole 4 and the stud body 3 the element 2 has a groove or channel 8 for a purpose hereinafter described. The stud hole 4 has a concave forepart or cup 7 which is complementary to the shape of base 12 of the joining stud 11 and is, therefore, in the preferred construction, cylindrical. The lower part of stud hole 4 comprises an oblique channel 17 complementary in shape to lip 16. The oblique channel 17 is at an angle to the cylindrical cup 17 so as to form a projecting lug 15 behind which the projecting lip of an opposed element can engage.

The rear of the stud body has a longitudinal recess or concavity 9 which is cylindrical having an axis parallel to the axis of the joining element 2.

As stated previously, a series of elements 1 are secured to each stringer, the elements being so positioned that the stud of one element is opposite the stud hole of the opposed element to thereby interlock the elements. In the following description the structure of the joining elements will be described in more detail and the operation of the slide fastener will also be described. In the drawings and following description some of the reference characters will be primed, see for example FIG. 8 showing reference numerals 1', 4' and 9'. The unprimed numbers refer to members of one element while the primed numbers refer to corresponding parts of the opposed element.

In FIG. 8, items 1 and 1' respectively represent a joining or interlocking element consisting of an element body 2 according to FIG. 1, to which is fitted a stud body 3 according to FIG. 7. The joining element is attached to the edge strip or stringer 19 of piece of fabric or similar material, see FIG. 8, and this edge strip is clamped between parts 2 and 3, between surfaces 6 and 18. For this purpose the attaching pin 13, FIG. 7, is first passed through the fabric or stringer 19 and then through the attaching pin hole 5 of FIG. 1, whereupon it is fixed by clinching the point 14. In this way all the joining elements are fitted to the two strips it is desired to join together.

Starting again at FIG. 1, item 2 is the element body, which has two holes, viz., the stud-hole 4 and the attaching pin hole 5. Between the two holes, passing crosswise over the upper face of the element, is a recess or groove 8 which has the task of receiving the edges of the two strips to be joined together, the bottom of which recess or groove is positioned at such a height that in the closed condition of the zip fastener these strip edges can be pressed against each other as indicated by 21 and 22 in FIG. 12. By giving the edge of these strips the correct size and shape and by giving groove 8 the correct depth it is possible to press the two strip edges against each other so as to effect perfect closure. If the strips be joined together are of watertight material, for instance of rubber or a plastic, it is possible with the zip fastener to obtain a watertight closure.

FIG. 3 shows that the upper face of the element body has a special form owing to the presence of the stud-hole 4. The stud-hole 4 consists of a cylindrical forepart or cup 7 and an oblique channel 17. The oblique channel 17 issues forth at an angle into the cylindrical forepart 7 so as to form a projecting lug 15, behind which the projecting cam or lip 16 (FIG. 7) of the joining stud 11 can engage as shown in FIGS 9 and 10.

The upper face 6 of the element body 2, see FIG. 4, is flat where it surrounds the attaching pin hole 5. The strip to be joined, 19 or 20 as the case may be, is clamped between this upper face 6 and the flat surface 18 of the stud body. The section of the element body 2 as seen in FIG. 2 shows that the attaching pin hole is widened somewhat at its rear end so as to form a riveting enlargement 10. The attaching pin hole 5 may have a rectangular section corresponding to the attaching pin 13 of the stud body 3, which is then also of rectangular section. As shown in FIGS. 2, 3 and 4, the rear end of the element body is slightly recessed. This recess 9, which extends in the same direction as the cup 7 at the front end, is necessary to enable the corner 46 of the channel to slide along the elements into the runner, FIG. 8. The projecting cam 16 also has a shape corresponding to the recess 9' as shown in FIG. 11.

The stud body 3, FIG. 5, is in three parts or sections: the guide piece or base 12, the projecting cam 16 and the attaching pin 13. The attaching pin has a point 14, so that when being placed in position the pin can easily be passed through the strip. The guide piece 12 of the stud has the same cylindrical form as the cup 7 of the element body and fits into it, so that as the two joining elements gradually interact to a greater extent as indicated in FIGS. 8, 9 and 10 the cylindrical guide piece 12 seeks the correct position by accommodating itself in the cup 7, whilst the projecting cam 16 effects the joint by catching behind the projecting lug 15. When the stud body 3 with the joining stud 11 is applied to the element body 2, the tail-like projecting cam 16 is placed in such a position that it points in a direction at right-angles to the describing lines (generatrices) of the cup 7, viz., in a backward direction. By "backward" is meant the direction in which the zip fastener has been closed, and by "forward" the direction in which closure has still to be effected.

When two interacting elements have not yet been made to engage with each other, the stud 16 of each element is positioned opposite the hole 4' of the other element, as shown in FIG. 11. When the two elements fully engage as shown in FIG. 10 and FIG. 12, each cam 16 grips behind the projecting lug or lug edge 15, and when the edges of the strips make good closure with each other these edges 21 and 22 are pressed on to each other by the bottoms of the traverse grooves 8 and 8'. The pliant strips 19 and 20 are then also joined together, FIG. 12.

FIGS. 13 and 14 show that the two stud joints of each pair of interacting elements are situated on either side of the strips, but the two projecting cams 16 both point backwards. If the runner 24 of FIG. 15 is now shifted to the right, the zip fastener will be closed to an increasing extent. The two cams of each pair of interacting elements engage successively in the same manner behind their projecting lug. The runner 24 has two channels 25 and 26, each of which has a section corresponding to the joining elements, see FIG. 16, which channels are positioned in V-formation and end jointly in a common channel 27, FIG. 17, so that a Y is formed. Each channel 25 and 26 has a groove 28 and 29 respectively, which serves to admit the respective strip of fabric or other pliant material. As the two strips are joined together at the channel 27, this channel has two grooves 28 and 29 which issue on to the respective opposite side faces of the runner, see FIG. 16. At the meeting of the two channels 25 and 26 an angle 23 is formed, see FIG. 8 and FIG. 15, around which the elements can slide, as they are provided with the recess 9 at their rear ends.

In this way each element has at its rear end two borders 46 and 47, see FIG. 9, which have a direction parallel to the respective portion of strip surface and perpendicular to the direction of the row of elements at that spot, with the aid of which borders the element slides over the respective channel wall of the runner.

Lastly, the runner has also a hole 31, FIG. 15, for accommodation of the locking pin. The pulling device is in fact provided with an automatic locking device actuated by a spring, which locking device, when pulled along the runner, allows the joining elements to slide freely through the runner but secures a row of elements in the runner the moment the runner is no longer pulled. The runner cannot then move further along or move backward of its own accord.

The locking device of the zip fastener consists of a flat, hollow hood 37, FIG. 20, which is fixed on to the runner with the aid of a pair of lips 39 and in which the manipulator 32 of the locking device is situated in the hollow 38 of the hood, which manipulator together with the locking pin 33 is positioned in the hole 31 of the runner. The hood 37 is open at its bottom end, and the two flat side walls each have a hole 40 whose walls at the open end of the hood are so positioned as to form an obtuse V. By means of its manipulator 32 the locking device can be inserted in the hood in such a manner that the locking pin projects from the aperture of the hood, and by means of a plate spring 43, FIG. 22, previously fitted in the hood, the locking device can be pushed in the direction of the hood aperture, FIG. 23. The manipulator 32 is furthermore provided with a hole 34 whose walls at the end averted from the locking pin are likewise in the form of an obtuse V, and this hole is so positioned that when the locking device is in position the holes 40 of the hood and the hole 34 of the manipulator partly overlap each other as shown in FIG. 23. The pull brace 44 of the pulling device is then passed through these three holes. If the pull brace 44 is moved in a direction at right-angles to that of the locking pin, it slides upwards along one of the bevels 41 or 42 of the holes 40 and, in so doing, becomes pressed against one of the bevels 35 or 36 of the hole 34 of the manipulator, so that the latter tends to penetrate further into the hood against the pressure of the spring 43. As a result the locking pin 33 moves a short distance further out of the hole and thereby releases the joining elements. When the pull brace 44 is no longer pulled, the spring 43 again presses the locking device further out of the hood, as a result of which the locking pin 33 is forced between the studs of the joining elements and prevents the runner from moving any further with respect to the elements. The zip fastener is now locked. Pivoted on to the pull brace 44 is a pull wing 45, FIGS. 24 and 25. As there is some clearance between the pull brace 44 and the walls of the holes 40 and 34, the spring can easily relax when the pull brace is no longer pulled.

What is claimed is:

1. In a slide fastener, a pair of stringers having identical series of identical interlocking elements, each element of one series being adapted to interlock with an oppositely positioned element on the other stringer independently of adjacent elements, each element having spaced apart ends, the ends being spaced apart in a direction parallel to the plane of the stringer and in a direction transverse to the edge of the stringer, each element having near one end a joining stud projecting transversely to the plane of the stringer, each element having near the other end a stud hole whose axis is transverse to the plane of the stringer, the stud hole of each element being adapted to receive the stud of the oppositely positioned element to thereby secure the elements to each other, each element being connected to its stringer so that the stud hole and the stud are on opposite sides of said stringer.

2. In a slide fastener, a pair of stringers having identical series of identical interlocking elements, each element of one series being adapted to interlock with an oppositely positioned element on the other stringer independently of adjacent elements, each element having near one end a joining stud projecting transversely to the plane of the stringer, each element having near the other end a stud hole, the stud hole of each element being adapted to receive the stud of the oppositely positioned element to thereby secure the elements to each other, each element being connected to its stringer so that the stud hole and the stud are on opposite sides of said stringer, the edge of each stringer being positioned between the stud and the stud hole of the elements secured thereto, said edges contacting each other when the fastener is in the closed position with the elements interlocked to provide a seal between the edges of the stringers.

3. In a slide fastener, a pair of stringers having identical series of identical interlocking elements, each element of one series being adapted to interlock with an oppositely positioned element on the other stringer independently of adjacent elements, each element having near one end a joining stud projecting transversely to the plane of the stringer, each element having near the other end a stud hole, the stud hole of each element being adapted to receive the stud of the oppositely positioned element to thereby secure the elements to each other, each element being connected to its stringer so that the stud hole and the stud are on opposite sides of said stringer, each element including a body portion having a pin receiving hole therein, said stud having a lower portion defining a pin, said pin passing through the stringer and being secured in said pin receiving hole to secure the element to the stringer.

4. A slide fastener as recited in claim 1 wherein the free end of the stud is constituted by a backwardly directed lip extending in a direction parallel to the edge of the stringer and wherein the stud and stud hole are complementary in shape.

5. A slide fastener as recited in claim 2 wherein each element is provided with a channel between its stud and its stud hole, said channel being parallel to the edge of the stringer with the channel of one element being opposed to the channel of the oppositely positioned element when the elements are interlocked, the edges of the stringer extending into the channel, the channel being so shaped that the edges of the stringer are pressed against each other to provide said seal.

6. A slide fastener as recited in claim 2 wherein the free end of the stud is constituted by a backwardly directed lip.

7. A slide fastener as recited in claim 2 wherein the stud and the stud hole are complementary in shape.

8. A slide fastener as recited in claim 7 wherein the stud has a base which is convex in shape.

9. A slide fastener as recited in claim 8 wherein the base of the stud is partially cylindrical in shape, the axis of the cylinder being parallel to the plane of the stringer and perpendicular to the edge of the cylinder.

10. A slide fastener as recited in claim 9 wherein the rear of the element has a partially cylindrical recess, the axis of the recess being parallel to the axis of the partially cylindrical base of the stud.

11. A slide fastener as recited in claim 2 including a slide having two channels meeting in a Y formation, each channel communicating with the side of the slide by means of a groove perpendicular to the plane of the Y, said grooves being on opposed sides of the slide.

12. A slide fastener as recited in claim 11 wherein said slide has a hole therein perpendicular to the plane of the Y, said hole extending from the exterior surface of the slide into one of said channels, a locking pin being inserted in said hole.

13. A slide fastener as recited in claim 12 wherein said locking pin forms part of a locking and manipulating device for the slide, said device including a manipulator having therein a hole, a portion of the hole being V shaped, a hollow hood receiving said manipulator, each of the opposed walls of the hood having therethrough a hole, portions of said hood holes being V shaped with the V of the manipulator hole pointing away from the slide and the V of the hood holes pointing toward the slide, a draw wing including a draw brace, said draw brace passing through the holes in the manipulator and the hood, resilient means biasing the manipulator in the direction of the slide to press the end of the locking pin between the studs of the interlocking elements to prevent movement of the slide.

14. In a slide fastener, a pair of stringers having identical series of identical interlocking elements, each element of one string being adapted to interlock with an oppositely positioned element in the other stringer independently of adjacent elements, each element including a body portion having near one end a pin receiving hole and near the other end a stud hole, each element including a stud having a backwardly pointing lip at one end, a pin portion at the other end, an intermediate base portion, said stud projecting transversely to the plane of the stringer, the pin of the stud passing through the stringer and being secured in the pin receiving hole to thereby clamp the stringer between the element body and the base of the stud whereby the stud and the stud hole are on opposite sides of said stringer, the element body having a channel between the stud and stud hole, the channel being parallel to the edge of the stringer, the channel in the elements of one series being opposed to the channel of the elements of the other series when the elements are interlocked, the edges of the stringers extending into the channel, said edges contacting each other when the fastener is in the closed position with the elements interlocked to provide a seal between the edges of the stringers, said channels being so shaped that the edges of the stringer are pressed against each other to provide said seal, the stud hole of each element being adapted to receive the stud of the oppositely positioned element to interlock said elements.

15. A slide fastener as recited in claim 14 where the stud and the stud hole are complementary in shape, the base of the stud being partially cylindrical, the axis of the cylinder being parallel to the plane of the stringer and perpendicular to the edge thereof.

16. A slide fastener as recited in claim 15 wherein the rear of each element is concave, said concavity being of a partially cylindrical shape with its axis being parallel to the axis of the stud base.

References Cited in the file of this patent

UNITED STATES PATENTS

| | | |
|---|---|---|
| 1,746,565 | Sundback | Feb. 11, 1930 |
| 2,339,350 | Morin | Jan. 18, 1944 |
| 2,554,929 | Sundback | May 29, 1951 |
| 2,736,940 | Morin | Mar. 6, 1956 |
| 2,867,878 | Sundback | Jan. 13, 1959 |
| 2,888,727 | Heimberger | June 2, 1959 |
| 2,907,087 | Morin | Oct. 6, 1959 |

FOREIGN PATENTS

| | | |
|---|---|---|
| 264,283 | Switzerland | Oct. 15, 1949 |
| 956,320 | France | Jan. 30, 1950 |